US007709541B2

(12) United States Patent
Lu et al.

(10) Patent No.: US 7,709,541 B2
(45) Date of Patent: May 4, 2010

(54) FISCHER-TROPSCH CATALYSTS INCORPORATING PROMOTER FOR INCREASING YIELDS OF $C_{5+}$ HYDROCARBONS AND METHODS FOR MAKING AND USING SAME

(75) Inventors: Yijun Lu, Lawrenceville, NJ (US);
Zhihua Wu, Lawrenceville, NJ (US);
Zhenhua Zhou, Lawrenceville, NJ (US);
Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 26 days.

(21) Appl. No.: 11/457,548

(22) Filed: Jul. 14, 2006

(65) Prior Publication Data

US 2008/0015267 A1    Jan. 17, 2008

(51) Int. Cl.
*C07C 27/00* (2006.01)
*C07C 27/06* (2006.01)
*B01J 23/00* (2006.01)
*B01J 23/40* (2006.01)
*B01J 23/42* (2006.01)
*B01J 23/58* (2006.01)
*B01J 23/70* (2006.01)
*B01J 23/72* (2006.01)
*B01J 23/74* (2006.01)

(52) U.S. Cl. ............ 518/718; 518/715; 502/324; 502/327; 502/328; 502/331; 502/336; 502/338; 502/349; 502/350; 502/351; 502/353

(58) Field of Classification Search ............ 502/324, 502/327, 328, 331, 336, 338, 349, 350, 351, 502/353; 518/715, 718
See application file for complete search history.

(56) References Cited

U.S. PATENT DOCUMENTS

| | | | | |
|---|---|---|---|---|
| 3,670,042 | A | * | 6/1972 | Croce et al. ............... 585/618 |
| 3,778,488 | A | * | 12/1973 | Croce ....................... 585/621 |
| 3,862,911 | A | | 1/1975 | Chabert ..................... 502/301 |
| 4,139,551 | A | * | 2/1979 | Ozyagcilar ................. 518/721 |
| 4,459,370 | A | * | 7/1984 | van der Wal et al. ........ 502/338 |
| 4,499,203 | A | * | 2/1985 | Toulhoat et al. ............ 502/247 |
| 4,503,162 | A | | 3/1985 | Windawi et al. ............ 502/174 |
| 4,552,750 | A | * | 11/1985 | van der Wal et al. ........ 423/656 |
| 4,618,597 | A | | 10/1986 | Fiato et al. ................. 502/324 |
| 4,624,942 | A | * | 11/1986 | Dyer et al. ................. 502/330 |
| 4,629,612 | A | * | 12/1986 | van der Wal et al. ..... 423/244.02 |
| 4,994,428 | A | | 2/1991 | Bell et al. .................. 502/330 |
| 5,668,075 | A | * | 9/1997 | Milam et al. ............... 502/338 |
| 5,686,378 | A | * | 11/1997 | Katamoto .................. 502/338 |
| 6,068,760 | A | | 5/2000 | Benham et al. ............ 518/700 |
| 6,156,809 | A | | 12/2000 | Clark et al. ................ 518/719 |
| 6,235,677 | B1 | * | 5/2001 | Manzer et al. ............. 502/232 |
| 6,265,342 | B1 | * | 7/2001 | Lim et al. .................. 502/326 |
| 6,265,451 | B1 | | 7/2001 | Zhou et al. ................ 518/700 |
| 6,277,895 | B1 | | 8/2001 | Zhou et al. ................ 518/715 |
| 6,297,394 | B1 | * | 10/2001 | Voit et al. .................. 558/459 |
| 6,551,958 | B1 | * | 4/2003 | Baier et al. ................ 502/304 |
| 6,589,909 | B2 | | 7/2003 | Yoshimura et al. ......... 502/327 |
| 6,660,889 | B2 | | 12/2003 | Fujimoto et al. ........... 568/429 |
| 6,777,452 | B2 | | 8/2004 | Zhou et al. ................ 518/713 |
| 6,852,669 | B2 | * | 2/2005 | Voit et al. .................. 502/338 |
| 6,864,384 | B2 | * | 3/2005 | Brazdil et al. ............. 558/325 |
| 6,903,141 | B2 | | 6/2005 | Zhou et al. ................ 518/719 |
| 6,960,325 | B2 | | 11/2005 | Kao et al. .................. 422/145 |
| 6,984,363 | B2 | | 1/2006 | Tonkovich et al. ......... 422/173 |
| 7,037,876 | B2 | * | 5/2006 | O'Brien et al. ............ 502/305 |
| 7,199,077 | B2 | * | 4/2007 | Hu et al. ................... 502/325 |
| 2003/0225169 | A1 | | 12/2003 | Yetman ..................... 518/726 |
| 2004/0102642 | A1 | * | 5/2004 | Brazdil et al. ............. 558/325 |
| 2004/0122115 | A1 | | 6/2004 | Espinoza et al. ........... 518/721 |

OTHER PUBLICATIONS

Zhou, P. Z., Status Review of Fischer-Tropsch Slurry Reactor Catalyst/Wax Separation Techniques, Burns and Roe Services Corporation, Feb. 1991.

* cited by examiner

*Primary Examiner*—Cam N Nguyen
(74) *Attorney, Agent, or Firm*—Workman Nydegger

(57) ABSTRACT

An improved skeletal iron catalyst is provided for use in Fischer-Tropsch synthesis reactions for converting CO and $H_2$ to hydrocarbon products. The skeletal iron catalyst is manufactured using iron and a removable non-ferrous component such as aluminum. The iron and removable non-ferrous component are mixed together to form a precursor catalyst and then a portion of the removable non-ferrous component is removed to leave a skeletal iron catalyst. One or more first promoter metals and optionally one or more second promoter metals are incorporated into the skeletal iron catalyst either by blending the promoter into the precursor catalyst during the formation thereof or by depositing the promoter on the skeletal iron. The first promoter metals comprises a metal selected from the group consisting of titanium, zirconium, vanadium, cobalt, molybdenum, tungsten, and platinum-group metals. The first promoter metal is selected to improve the yield of $C_{5+}$ hydrocarbons when the skeletal iron catalyst is used in a Fischer-Tropsch reaction.

24 Claims, No Drawings

FISCHER-TROPSCH CATALYSTS INCORPORATING PROMOTER FOR INCREASING YIELDS OF $C_{5+}$ HYDROCARBONS AND METHODS FOR MAKING AND USING SAME

BACKGROUND OF THE INVENTION

1. The Field of the Invention

The present invention relates to the manufacture of Fisher-Tropsch catalysts for making synthetic hydrocarbon fuels from carbon monoxide and hydrogen. More particularly, the invention relates to skeletal iron catalysts that incorporate a promoter metal to increase the yield of $C_{5+}$ hydrocarbons in Fischer-Tropsch synthesis reactions.

2. Related Technology

Skeletal catalysts, also known as "sponge-metal catalysts", have been known for decades and are used extensively in many industries and organic synthesis. The use of skeletal catalysts is particularly prevalent in reactions involving hydrogenation, dehalogenation, and desulfurization. The first skeletal catalysts were developed by Murrey Raney in the 1920's using aluminum-nickel alloys. The catalyst is prepared by treating a block of nickel-aluminum alloy with sodium hydroxide to remove a portion of the aluminum. Removing a portion of the aluminum leaves behind a porous nickel framework. The porous framework gives the catalyst high surface area and increased catalytic activity. These nickel-based skeletal catalysts are often called "Raney Nickel." More recently, iron-based skeletal catalysts have been developed by Hydrocarbon Technologies, Inc. for use in Fischer-Tropsch synthesis reactions for making synthetic fuels.

Technologies for making synthetic fuels typically begin with the partial oxidation of carbon-based materials such as methane or coal to produce carbon monoxide and hydrogen, commonly known as "synthesis gas" or "syngas". Next, in a Fischer-Tropsch reaction, the synthesis gas is converted to more valuable hydrocarbons such as naphtha, diesel and paraffin wax. The general chemistry of the Fischer-Tropsch reaction is as follows:

$$nCO+(2n+1)H_2 \rightarrow C_nH_{2n+2}+nH_2O \qquad (1)$$

$$CO+H_2O \rightarrow CO_2+H_2 \qquad (2)$$

$$2nCO+(n+1)H_2 \rightarrow C_nH_{2n+2}+nCO_2 \qquad (3)$$

One competing reaction may be the water-gas shift reaction, equation (2), in which carbon monoxide is consumed in a reaction with water generated from equation (1), above, to form carbon dioxide ($CO_2$) and hydrogen ($H_2$). The net effect is the consumption of at least some of the water produced in equation (1) and an alteration in the $H_2$:CO ratio.

The Fischer-Tropsch reaction is carried out in the presence of a catalyst. Catalysts used in the Fischer-Tropsch process vary in composition based upon the product mixture desired and reaction conditions employed but commonly comprise at least one catalytic metal selected from Group VIIIA, preferably Co, Ru, Fe or Ni. Iron is frequently used because of its high reactivity and lower cost than other suitable metals. Furthermore, iron catalysts have high water-gas shift activity and tend to favor reaction (3) above.

Methods for making iron-based Fischer-Tropsch catalysts are known in the art. Two of the most common iron-based Fischer-Tropsch catalysts are precipitated iron and fused iron. Preparation of a precipitated iron catalyst typically consists of precipitating iron hydroxides and oxides from an aqueous solution; washing, drying and calcining the precipitate; and pretreating the catalyst.

Fused iron catalysts are typically prepared by adding promoters to the melted oxide at high temperature. Solid chunks are obtained from the cooled mixture, then ground and sized. The specific catalytic activity of fused iron catalysts is generally lower than that of precipitated iron catalysts. The catalytic activity of fused iron has been measured in stirred-tank reactors as half that of precipitated iron catalysts (See Fuel Processing Technology, 1992, Vol. 30, pp. 83-107).

While precipitated iron catalysts have greater activity than fused iron catalysts, precipitated iron catalyst have their own disadvantages. For example, precipitated iron is typically in the form of very fine metal particles. These small particles can escape from the reactor as a contaminant of the hydrocarbon product, especially waxy products. Iron particulates contaminating waxy products are often very difficult to remove from waxy products, thereby significantly increasing the processing costs of these products and diminishing the value of the overall process.

Recently, skeletal iron catalysts have been developed for use in Fischer-Tropsch reactions. Skeletal iron catalysts advantageously have high surface areas, and therefore high activity, but are less likely to contaminate the waxy product as compared to precipitated iron catalysts. The skeleton iron catalyst has also proven to be a good potential Fischer-Tropsch catalyst because it needs no pretreatment prior to test, has lower cost per unit mass of metal, good resistance to poisoning, and good structural uniformity.

Despite the advantages of a skeletal iron catalyst, there is still a need to improve the skeletal iron catalyst such that it can better compete economically with traditional sources of hydrocarbons fuels. One inefficiency with all Fischer-Tropsch catalysts is chain termination that results in production of low value short chain hydrocarbons (e.g., $C_2$-$C_4$ hydrocarbons). Chain termination can occur when a hydrogen radical reacts with the growing end of the hydrocarbon chain. Once chain termination has occurred, the length of the hydrocarbon cannot be extended. While it is desirable for chain termination to eventually occur, it is generally undesirable for chain termination to produce $C_2$-$C_4$ hydrocarbons.

BRIEF SUMMARY OF THE INVENTION

The present invention provides a skeletal iron catalyst for use in Fischer-Tropsch synthesis reactions for converting CO and $H_2$ to hydrocarbon products. The skeletal iron catalysts of the present invention incorporate a promoter metal that improves the yield of hydrocarbons greater than $C_4$ (i.e., $C_{5+}$ hydrocarbons). Producing higher yields of $C_{5+}$ hydrocarbons improves the efficiency of the Fischer-Tropsch process and makes it more competitive with traditional sources of hydrocarbons.

In an exemplary embodiment, the skeletal iron catalyst of the present invention includes from about 70 wt % to about 90 wt % iron in the form of skeletal iron. The skeletal iron catalyst also includes from about 0.01 wt % to about 10 wt % of one or more first promoters. The one or more first promoters include a metal selected from the group consisting of titanium, zirconium, vanadium, cobalt, molybdenum, tungsten, and platinum-group metals. The one or more first promoter can be incorporated into the bulk of the skeletal iron catalyst (e.g., as an alloy), or it can be deposited on the skeletal iron (e.g., by impregnation). The first promoter preferably comprises titanium (e.g., titanium dioxide). Titanium has been found to significantly promote the formation of $C_{5+}$ hydrocarbons.

The skeletal iron catalyst of the present invention may optionally include one or more second promoters. The second promoter includes a metal selected from the group consisting of manganese, calcium, copper, chromium, potassium, magnesium, and the like. The one or more second promoters can be included in an amount from about 0.01 wt % to about 20 wt %. The one or more second promoters can be incorporated into the bulk of the skeletal iron (e.g., as an alloy) or can be deposited on the skeletal iron (e.g., by impregnation).

In a preferred embodiment, the skeletal iron catalyst includes manganese oxide and potassium as second promoters. Typically the manganese oxide is incorporated into the bulk iron and the potassium is deposited on the skeletal iron by impregnation.

The promoted skeletal iron catalyst of the present invention is prepared by first forming a catalyst precursor. The catalyst precursor is formed by combining iron and a removable non-ferrous component such as aluminum, antimony, silicon, tin, zinc, combinations thereof, and the like. The one or more first promoters and one or more optional second promoters can also be included in the catalyst precursor. Alternatively, or in combination, the one or more first and second promoters can be deposited on the skeletal iron catalyst after it is formed, as described below. In an exemplary embodiment, the catalyst precursor is formed by melting and mixing the iron and a removable non-ferrous component. In a preferred embodiment, the catalyst precursor is melted and then rapidly cooled to form a solid precursor mixture that is then pulverized to form catalyst precursor particles.

The skeletal iron catalyst is formed by removing a portion of the removable non-ferrous component from the catalyst precursor. All or a portion of the non-ferrous component can be removed by treating the catalyst precursor with a caustic solution such as a 10%-50% concentration of NaOH or KOH. Removing all or a portion of the non-ferrous component leaves behind a porous framework of iron (i.e., skeletal iron) and any non-removable first and/or second promoters.

The skeletal iron catalyst at least includes a first promoter and optionally a second promoter. If the first and/or second promoter are to be deposited on the catalyst, this step is performed after the removable non-ferrous component has been removed from the precursor catalyst. In this case, the promoter is typically deposited by dissolving the promoter in an aqueous and/or organic solvent and mixing it with the skeletal iron catalyst. The solvent can be removed using any means such as heat and/or a vacuum.

The promoted skeletal iron catalyst of the present invention is particularly useful in Fischer-Tropsch synthesis reactions. The skeletal iron catalyst is highly active due to its large surface area, which is typically about 20 m$^2$/g to about 80 m$^2$/g. Furthermore, the skeletal iron catalyst is easy to manufacture as compared to other Fischer-Tropsch catalyst such as precipitated iron catalysts.

The promoted skeletal iron catalysts of the present invention provide improved yields of $C_{5+}$ hydrocarbons in Fischer-Tropsch reactions. In particular, the inclusion of titanium has been found to be particularly advantageous for increasing yields of $C_{5+}$ hydrocarbons. It is believed that some first promoter metals (e.g., titanium) are able to improve yields of $C_{5+}$ hydrocarbons because of their increased acidity as a Lewis acid relative to iron. It is believed that the increased acidity reduces the concentration of hydrogen radicals, which can cause chain termination, thereby allowing chain lengthening to continue for a longer period of time. The present invention, however, is not limited by this theory.

These and other advantages and features of the present invention will become more fully apparent from the following description and appended claims as set forth hereinafter.

DETAILED DESCRIPTION OF EXEMPLARY EMBODIMENTS

I. Introduction

An improved skeletal iron catalyst is provided for use in Fischer-Tropsch synthesis reactions for converting CO and $H_2$ to hydrocarbon products. The skeletal iron catalyst is manufactured using iron and a removable non-ferrous component such as aluminum. The iron and removable non-ferrous component are mixed together to form a precursor catalyst and then a portion of the non-ferrous component is removed to leave a skeletal iron catalyst. One or more first promoter metals and optionally one or more second promoter metals are incorporated into the skeletal iron catalyst. The first promoter comprises a metal such as titanium selected to improve the yield of $C_{5+}$ hydrocarbons when the skeletal iron catalyst is used in a Fischer-Tropsch reaction.

II. Components Used to Make Skeletal Iron Catalysts

A. Ferrous and Non-Ferrous Components

The ferrous component is iron metal. The iron can be provided in any form so long as it can be mixed with a non-ferrous component and can form solid iron.

The removable non-ferrous component can be any element or compound that can be mixed and/or alloyed with iron and then etched or otherwise leached out of the iron (e.g., leached using a NaOH or KOH solution). Examples of suitable removable non-ferrous components include aluminum, antimony, silicon, tin, zinc, or combinations of these.

B. First Promoter

The first promoter is an element or compound that includes a metal capable of increasing the yield of $C_{5+}$ hydrocarbons when incorporated into a skeletal iron catalyst used in a Fischer-Tropsch reaction. The first promoter includes at least one metal selected from the group of titanium, zirconium, vanadium, cobalt, molybdenum, tungsten, and platinum-group metals. The metals used can be in the form of an elemental metal, a metal salt, a metal oxide, or other suitable form. The metals can be provided as a powder, metal chips, a solution, or other suitable form.

The first promoters can be metals in elemental form, oxides, or salts. Examples of elemental metals include the reduced form of titanium, zirconium, vanadium, cobalt, nickel, tin, molybdenum, tungsten, or a platinum-group metal; examples of suitable oxides include titania, zirconia, vanadium oxides, cobalt oxides, molybdenum oxides, tungsten oxides zinc oxide, tin oxide, nickel oxide or mixture of these; examples of suitable salts include zinc titanium oxide and zinc molybdenum oxide and mixtures of these.

C. Optional Second Promoter

The optional second promoters are elements or compounds incorporated into the skeletal iron catalyst to improve the catalytic properties of the catalyst in a Fischer-Tropsch reaction, make the catalyst less susceptible to poisoning, and/or improve the structural stability of the catalyst, thereby reducing the tendency of catalyst fines to form and remain in the hydrocarbon products. The second promoters can be provided in elemental form, as an oxide, or as a salt. Examples of suitable metals for second promoters include manganese, calcium, copper, chromium, potassium, magnesium, and combinations of these.

Manganese, especially in the form of $Mn_2O_3$, is a preferred second promoter. Manganese oxide can be included in the catalyst in an amount in a range from about 2% to about 8% by weight.

Potassium is also a preferred second promoter. Potassium is typically applied to the skeletal iron as an alcoholic solution. Examples of suitable alcoholic solutions containing potassium include, but are not limited to, methanolic potassium hydroxide, ethanolic potassium hydroxide, or alcoholic potassium carbonate. Potassium can be incorporated into the skeletal iron catalyst in an amount in a range from about 0.01% to about 3% by weight of skeletal iron.

D. Caustic Solutions and Solvents

The caustic solution can be used to remove all or a portion of the removable non-ferrous material from the iron to form skeletal iron. Examples of suitable caustic solutions include a 10%-50% solution of NaOH or KOH.

Water and/or organic solvents can be used to impregnate skeletal iron with metals and/or to wash the catalyst. Examples of suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, and mixtures thereof.

III. Methods of Making Skeletal Iron Catalysts

The method of the present invention generally includes forming a catalyst precursor from iron and at least one non-ferrous component; optionally forming particles from the catalyst precursor; and removing a portion of a removable non-ferrous component to form skeletal iron. One or more first promoter metals and optionally one or more second promoter metals are incorporated into the skeletal iron catalyst. The promoters can be incorporated into the catalyst by blending the promoter into the precursor catalyst during the formation thereof or by depositing the promoter on the skeletal iron.

In an exemplary embodiment, the catalyst precursor is formed by mixing together about 30 wt % to about 50 wt % iron, about 40 wt % to about 60 wt % aluminum, about 2 wt % to about 8 wt % manganese (e.g., magnesium oxide, which is a second promoter), and about 0.1% wt % to about 8 wt % of a first promoter. Preferably the first promoter is one or more of titanium, zirconium, molybdenum, or vanadium (including oxides thereof).

The metals can be provided as powders, chips, strips, or any other form suitable for mixing and/or heating. In an exemplary embodiment, the metals are placed in a furnace such as an electric arc induction furnace. Typically, the metals are heated in an arc induction furnace under an inert gas such as nitrogen or argon and stirred until uniformly mixed. The resulting molten iron alloy is then rapidly cooled to room temperature to yield a solid catalyst precursor metal composition.

In a preferred embodiment, the solid catalyst precursor is mechanically pulverized to form catalyst precursor particles. Mechanically forming the particles can be done using many techniques known in the art. The particle size of the catalyst precursor particles is typically in a range from about 0.1 mm to 10 mm.

The skeletal iron catalyst is prepared from the iron catalyst precursor (e.g., in the form of catalyst precursor particles) by removing a portion of the removable non-ferrous component. In an exemplary embodiment, the removable non-ferrous component is removed using a caustic solution. This procedure is typically performed under a hydrogen atmosphere. The procedure is performed by heating a sufficient volume of NaOH or KOH caustic solution (10-50% concentration) at a temperature between about 30° C. and 95° C. The catalyst precursor is added to this solution and maintained under these reaction conditions for about 2-150 minutes, which allows a significant amount of the removable non-ferrous component (e.g., aluminum) to leach out of the catalyst precursor, thereby forming skeletal iron. After removing at least a portion of the removable non-ferrous component, the iron content is preferably between about 40 wt % and 90 wt %.

One or more first or second promoters can be incorporated into the skeletal iron catalyst by depositing the promoter on the skeletal iron. In a preferred embodiment, a second promoter such as potassium is incorporated into the skeletal iron by impregnation. The impregnation of potassium onto the skeleton iron can be performed by first preparing a solution containing a small amount of an aqueous solution of potassium carbonate or nitrate and a solvent such as water or ethanol. The amount of potassium used is based on the iron content in the catalyst. Preferably the weight ratio of potassium to iron is about 0.5:100 to about 3:100. The skeletal iron catalyst is then added to the potassium solution. The solvent is then driven off using heat and/or a vacuum.

As shown by the exemplary embodiments above, in some cases it is preferable to incorporate a promoter after formation of the skeletal iron catalyst has been formed. In other cases it can be advantageous to incorporate the promoter into the precursor catalyst composition. For example, if the promoter is added to obtain an iron alloy that is uniform throughout the skeletal iron, it can be advantageous to incorporate the promoter in the catalyst precursor. Alternatively, if the promoter is provided as a solution and/or if the promoter is most effective on the surface of the skeletal iron or impregnated near the surface, it can be advantageous to incorporate the promoter after formation of the skeletal iron. The heating temperatures during formation of the catalyst precursor can also necessitate incorporating a promoter after the skeletal iron is formed. This is often advantageous in cases where the promoter is likely to vaporize during heating.

In a final step, the skeletal iron catalyst is typically activated. The catalyst can be activated by hydrogen with a flow of 0.05-1 NL/g-cat/h in a fixed-bed reactor at a temperature of 300-350° C. for 2-12 hours. The active promoted skeletal iron catalyst can then be mixed with a suitable reaction medium such as liquid paraffin or ethanol and transferred into a reactor for use in a Fischer-Tropsch synthesis processes. Alternatively, the promoted skeletal iron catalyst can be activated or pretreated by mixing with a suitable reaction medium such as liquid paraffin to provide a slurry form, and then transferred directly into a slurry-phase Fischer-Tropsch reactor and treated with hydrogen at a flow rate of 0.3-3 NL/g-cat/h and at 300-350° C. for 3-48 hours. The skeletal iron catalyst is then ready for effective use in catalytic Fischer-Tropsch synthesis processes utilizing CO and $H_2$ feedstreams for producing desired hydrocarbon products.

The final obtained skeletal iron catalyst has a different weight composition then the starting material due to leaching of the removable non-ferrous component. Typically, the final catalyst has the following composition on the basis of metal elements: about 75 wt % to about 90 wt % iron, about 1 wt % to about 10 wt % manganese, about 1 wt % to about 10 wt % titanium, zirconium, molybdenum, and/or vanadium, and about 0.01 wt % to about 10 wt % potassium. The promoted skeletal iron catalysts have surface areas in the range of about 20-80 m$^2$/g, and preferably about 30-65 m$^2$/g. Preferably, the skeletal iron catalysts have a particle size in a range from about 10 microns to about 10 mm.

IV. Methods of Using Skeletal Iron Catalysts

The promoted skeletal iron catalysts of this invention are particularly useful in catalytic processes for Fischer-Tropsch synthesis of hydrocarbons products from CO and H$_2$ feedstreams. The skeletal iron catalysts of the present invention can be used in traditional reactor types used for carrying out Fischer-Tropsch reactions. Preferably the reactor is a slurry-phase or a fixed-bed reactor system.

For slurry-phase and fixed-bed reactors, the skeletal iron catalyst is preferably a particulate. For slurry-phase reactors, the skeletal iron catalyst is preferably a particulate with a particle size in a range from about 10 microns to about 2 mm, more preferably 20 microns to about 1 mm. For a fixed-bed reactor, the skeletal iron catalyst is preferably a particulate with a particle size in a range from about 1 mm to about 10 mm, more preferably from about 2 mm to about 8 mm.

Performance of the skeletal iron can be optimized by adjusting the reaction conditions in the reactor. An example of suitable reaction conditions are as follows: (a) a molar ratio of H$_2$ to CO of about 0.5:1 to about 5:1; (b) a skeletal iron catalyst loading of about 5 wt. % to about 40 wt. % relative to the reaction medium (e.g., liquid paraffin); (c) a reaction temperature in a range from about 200° C. to about 350° C.; (d) a system pressure in a range from about 1 MPa to about 5 MPa; and (e) a gas hourly space velocity in a range from about 0.5 L/g-cat/h to about 5 L/g-cat/h.

As the Fischer-Tropsch reaction proceeds, a desired hydrocarbon liquid product can be withdrawn from the reactor. Typically the hydrocarbon product will include one or more fractions of hydrocarbons. The skeletal iron catalyst of the present invention is advantageously more selective for $C_{5+}$ hydrocarbons, which are typically more valuable than $C_1$-$C_4$ hydrocarbons, compared to a skeletal iron catalyst in the absence of the first promoter metal.

In some cases one or more fractions of hydrocarbon product may contain fine iron catalyst particles, though the quantity of fines will typically be significantly lower than where a precipitated iron catalyst is used. Catalyst fines can be removed using any known technique. An exemplary method for separating catalyst fines from waxy products is disclosed in U.S. Pat. No. 6,903,141 to Zhou et al., the disclosure of which is hereby incorporated by reference.

V. Examples

The following examples provide exemplary formulas for manufacturing skeletal iron catalysts. Example 1 is a comparative example that does not include a first promoter metal according to the present invention. Examples 2-5 provide formulas for manufacturing improved skeletal iron catalysts according to the present invention. Example 6 describes the use of the catalysts manufactured in Examples 1-5 in a Fischer-Tropsch reaction.

Example 1 (Comparative)

Example 1 describes the preparation of a skeletal iron catalyst. Example 1 is given for purposes of comparison with Examples 2-5. A skeletal iron catalyst was prepared by mixing together iron strips, aluminum pieces, and other metals/compounds in weight ratio of 58% Al, 38% Fe, and 4% Mn$_2$O$_3$. The components were mixed and placed in an electric arc induction furnace. The metals were melted by igniting an electric arc using high current and low voltage under an inert atmosphere (argon). The melted metals were stirred and heated until they were uniformly mixed. The molten iron alloy was then cooled to room temperature to form a solid catalyst precursor composition. The catalyst precursor composition was mechanically pulverized to form catalyst precursor particles having a particle size of 0.1-10 mm.

Under a hydrogen atmosphere, 2000 ml of an aqueous 25% NaOH solution was heated to 75° C. To this, 100 g of the catalyst precursor particles were added at periodic intervals. The reaction condition was maintained for 90 minutes to leach a major portion of the aluminum from the precursor particles, thereby forming skeletal iron catalyst particles. The catalyst particles were washed with de-ionized water to pH 7, and then with ethanol.

The skeletal iron catalyst was then impregnated with potassium. An aqueous solution of potassium carbonate was mixed with an amount of ethanol and then applied to the skeletal iron catalysts in a weight ratio of potassium carbonate to iron of about 1:100. The ethanol and water were removed under vacuum while heating to 60° C. for 3 hours. The skeletal iron catalyst was suitable for use in a Fischer-Tropsch reaction.

Example 2

Example 2 describes a novel formulation for use in manufacturing an improved skeletal iron catalyst according to the present invention. The manufacture of the catalyst precursor particles in Example 2 was carried out essentially identical to Example 1 except that TiO$_2$ was mixed with the iron and other metals in a weight ratio of 56% Al:38% Fe:3% Mn$_2$O$_3$:3% TiO$_2$. The metals were heated and mixed as described for Example 1.

Skeletal iron particles were formed from the catalyst precursor using the same procedure as described in Example 1. The resulting skeletal iron particles were impregnated using the same procedure as Example 1 except that potassium was impregnated into the catalyst using a commercially available 0.1N KOH-Methanol solution.

Example 3

Example 3 describes a novel formulation for manufacturing an improved skeletal iron catalyst according to the present invention. The manufacture of the catalyst precursor particles in Example 3 was carried out essentially identical to Example 2 except that TiO$_2$ was mixed with the iron and other metals in a weight ratio of 55% Al:35% Fe:5% Mn$_2$O$_3$:5% TiO$_2$. The steps for heating, mixing, forming particles, leaching aluminum, and impregnating with K were carried out as described in Example 2.

Example 4

Example 4 describes a novel formulation for manufacturing a skeletal iron catalyst according to the present invention. The manufacture of the catalyst precursor particles in Example 4 was carried out essentially identical to Example 2 except that the TiO$_2$ was replaced with zirconium and mixed with the iron and other metals in a weight ratio of 56% Al:38% Fe:3% Mn$_2$O$_3$:3% Zr. The steps for heating, mixing, forming particles, leaching aluminum, and impregnating with K were carried out as described in Example 2.

Example 5

Example 5 describes a novel formulation for manufacturing a skeletal iron catalyst according to the present invention.

The manufacture of the catalyst precursor particles in Example 5 was carried out essentially identical to Example 2 except that the $TiO_2$ was replaced with vanadium and mixed with the iron and other metals in a weight ratio of 56% Al:38% Fe:3% $Mn_2O_3$:3% V. The steps for heating, mixing, forming particles, leaching aluminum, and impregnating with K were carried out as described in Example 2.

Example 6

Use of Catalysts in Fischer-Tropsch Reaction

Example 6 describes the use of the catalysts manufactured in Examples 1-3 in a Fischer-Tropsch reaction. The catalysts of Examples 1-3 were prepared as a slurry with a catalyst particle size of 0.044-0.074 mm. The catalysts were then tested in a slurry bed reactor in a Fischer-Tropsch reaction. The reaction conditions for testing of each of the catalysts was as follows: (a) catalyst loading of 15 wt. %, (b) $H_2$/CO molar ratio of 1:1, (c) reactor temperature of 260° C., and (d) reactor pressure of 2.5 MPa. The results of Fischer-Tropsch reaction are shown below in Table 1. The $CO_2$ selectivity was based on CO conversion.

TABLE 1

| | Example | | |
|---|---|---|---|
| | 1 | 2 | 3 |
| Conversion, % | | | |
| CO | 86.1 | 83.2 | 84.5 |
| $H_2$ | 50.9 | 46.4 | 48.9 |
| $CO_2$ Selectivity | 0.46 | 0.43 | 0.45 |
| Yield distribution, % | | | |
| $C_{1-2}$ | 12.89 | 11.58 | 12.66 |
| $C_{3-4}$ | 16.77 | 14.33 | 15.78 |
| $C_{5+}$ | 70.34 | 74.19 | 71.56 |

As can be seen from Table 1, the use of the promoters of the invention results in increased yields of the more valuable $C_{5+}$ hydrocarbons compared to the other catalysts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A Fischer-Tropsch catalyst having a skeletal iron structure and increased catalytic selectivity for $C_{5+}$ manufactured according to a method, comprising:
    forming a solid catalyst precursor composition by:
        melting together iron metal and a removable non-ferrous component comprising one or more of aluminum, antimony, silicon, tin, or zinc to form a molten iron alloy; and
        cooling the molten iron alloy to yield the solid catalyst precursor composition;
    removing at least a portion of the removable non-ferrous component from the solid catalyst precursor composition to form a skeletal iron structure composed of a porous metal framework having a specific surface area of at least about 20 $m^2$/g, wherein the porous metal framework is comprised of fused iron metal and void spaces where the removable non-ferrous component was removed;
    depositing one or more first promoter metals on the skeletal iron structure or incorporating the one or more first promoter metals into the solid catalyst precursor composition during formation thereof or both,
        wherein the one or more first promoter metals comprise at least one metal selected from the group consisting of titanium, zirconium, vanadium, cobalt, molybdenum, tungsten, and platinum-group metals,
        wherein the one or more first promoter metals increase catalytic selectivity for $C_{5+}$ in a Fischer-Tropsch synthesis compared to a skeletal iron catalyst in the absence of the one or more first promoter metals; and
    optionally, depositing one or more second promoter metals on the skeletal iron structure or incorporating one or more second promoter metals into the catalyst precursor composition during the formation thereof or both,
        wherein the one or more second promoter metals comprise at least one metal selected from the group consisting of manganese, calcium, copper, chromium, potassium, and magnesium.

2. A Fischer-Tropsch catalyst as claimed in claim 1, wherein the first promoter metal comprises at least one of titanium, zirconium, vanadium, cobalt, or molybdenum.

3. A Fischer-Tropsch catalyst as claimed in claim 1, wherein the first promoter metal comprises titania.

4. A Fischer-Tropsch catalyst as claimed in claim 1, wherein the first promoter metal is incorporated into the solid catalyst precursor composition during the formation thereof.

5. A Fischer-Tropsch catalyst as claimed in claim 1, wherein the first promoter metal is deposited on the skeletal iron structure after formation thereof.

6. A Fischer-Tropsch catalyst as claimed in claim 1, wherein the solid catalyst precursor composition and the skeletal iron structure formed therefrom comprise a plurality of particles having a particle size between about 10 microns and about 10 mm.

7. A Fischer-Tropsch catalyst as claimed in claim 6, wherein the plurality of particles are formed by (i) combining at least the iron metal, the removable non-ferrous component, and the first promoter metal to form a solid composition, (ii) pulverizing the solid composition to form the plurality of particles, and (iii) removing the removable non-ferrous component.

8. A Fischer-Tropsch catalyst as claimed in claim 6, wherein the particles have a particle size between about 10 microns and about 2 mm.

9. A Fischer-Tropsch catalyst as claimed in claim 6, wherein the particles have a particle size between about 1 mm and about 10 mm.

10. A Fischer-Tropsch catalyst as claimed in claim 1, wherein the removable non-ferrous component is removed by leaching with a caustic solution.

11. A catalytic Fischer-Tropsch synthesis process, comprising feeding $H_2$ and CO into a reactor containing the Fischer-Tropsch catalyst manufactured according to claim 1 and withdrawing from the reactor a hydrocarbon product.

12. A Fischer-Tropsch catalyst having a skeletal iron structure and increased catalytic selectivity for $C_{5+}$ manufactured according to a method, comprising:
    forming a solid catalyst precursor composition by:
        melting together:
            iron metal;
            manganese or an oxide thereof;

a removable non-ferrous component comprising one or more of aluminum, antimony, silicon, tin, or zinc; and one or more first promoter metals, wherein the one or more first promoter metals comprise a metal selected from the group consisting of titanium, zirconium, vanadium, cobalt, and molybdenum to form a molten iron alloy; and cooling the molten iron alloy to yield the solid catalyst precursor composition;

pulverizing the solid catalyst precursor to form a plurality of smaller precursor particles; and removing at least a portion of the removable non-ferrous component from the precursor particles to form the Fischer-Tropsch catalyst having a skeletal iron structure composed of a porous metal framework having a specific surface area of at least about 20 $m^2/g$, wherein the porous metal framework is comprised of fused iron metal and void spaces where the removable non-ferrous component was removed;

wherein the one or more first promoter metals increase catalytic selectivity for $C_{5+}$ in a Fischer-Tropsch synthesis compared to a skeletal iron catalyst in the absence of the one or more first promoter metals.

13. A Fischer-Tropsch catalyst as claimed in claim 12, wherein the one or more first promoter metals comprise titanium.

14. A Fischer-Tropsch catalyst as claimed in claim 12, further comprising impregnating the Fischer-Tropsch catalyst with potassium.

15. A catalytic Fischer-Tropsch synthesis process, comprising feeding $H_2$ and CO into a reactor containing the Fischer-Tropsch catalyst manufactured according to claim 12 and withdrawing from the reactor a hydrocarbon product.

16. A Fischer-Tropsch catalyst having a skeletal iron structure and increased catalytic selectivity for $C_{5+}$, comprising:

a skeletal iron catalyst comprising from about 70 wt % to about 90 wt % iron in the form of a skeletal iron structure composed of a porous metal framework having a specific surface area of at least about 20 $m^2/g$, wherein the porous metal framework is comprised of fused iron metal and void spaces formed by removing a removable non-ferrous component from the fused metal iron, the skeletal iron catalyst further comprising:

from about 0.01 wt % to about 10 wt % of one or more first promoter metals comprising at least one metal selected from the group consisting of titanium, zirconium, vanadium, cobalt, molybdenum, tungsten, and platinum-group metals; and from about 0.01 wt % to about 20 wt % of one or more second promoter metals comprising a metal selected from the group consisting of manganese, calcium, copper, chromium, potassium, and magnesium, wherein the one or more first promoter metals increase catalytic selectivity for $C_{5+}$ in a Fischer-Tropsch synthesis compared to a skeletal iron catalyst in the absence of the one or more first promoter metals.

17. A Fischer-Tropsch catalyst as claimed in claim 16, wherein the one or more first promoter metals comprise titanium.

18. A Fischer-Tropsch catalyst as claimed in claim 16, wherein the one or more first promoter metals have a weight percent of at least about 1%.

19. A Fischer-Tropsch catalyst as claimed in claim 16, wherein the one or more promoter metals are deposited on a surface of the skeletal iron structure.

20. A Fischer-Tropsch catalyst as claimed in claim 16, wherein the one or more first promoter metals are substantially evenly dispersed throughout the skeletal iron structure.

21. A Fischer-Tropsch catalyst as claimed in claim 16, wherein the Fischer-Tropsch catalyst comprises a plurality of particles.

22. A Fischer-Tropsch catalyst as claimed in claim 21, wherein the particles have a particle size in a range of about 10 microns to about 2 mm.

23. A Fischer-Tropsch catalyst as claimed in claim 21, wherein the particles have a particle size in a range of about 1 mm to about 10 mm.

24. A catalytic Fischer-Tropsch synthesis process, comprising feeding $H_2$ and CO into a reactor containing the Fischer-Tropsch catalyst of claim 16 and withdrawing from the reactor a hydrocarbon product.

* * * * *

UNITED STATES PATENT AND TRADEMARK OFFICE
CERTIFICATE OF CORRECTION

| | | |
|---|---|---|
| PATENT NO. | : 7,709,541 B2 | Page 1 of 1 |
| APPLICATION NO. | : 11/457548 | |
| DATED | : May 4, 2010 | |
| INVENTOR(S) | : Lu et al. | |

It is certified that error appears in the above-identified patent and that said Letters Patent is hereby corrected as shown below:

Title Page
Item 57, ABSTRACT, Line 14, change "comprises" to --comprise--

Column 1
Line 43, change "$n$H2O" to --$n$H$_2$O--

Column 2
Line 12, change "catalyst" to --catalysts--
Line 33, change "hydrocarbons" to --hydrocarbon--

Column 3
Line 54, change "catalyst" to --catalysts--

Column 4
Line 56, change "oxides zinc oxide," to --oxides, zinc oxides,--

Column 6
Line 23, after "Preferably" insert --,--
Line 29, after "cases" insert --,--
Line 60, change "then" to --than--

Column 7
Line 9, change "hydrocarbons" to --hydrocarbon--
Line 12, after "Preferably" insert --,--
Line 40, after "In some cases" insert --,--

Signed and Sealed this

Twenty-eighth Day of September, 2010

David J. Kappos
*Director of the United States Patent and Trademark Office*